United States Patent
Ganesh et al.

(10) Patent No.: US 7,913,105 B1
(45) Date of Patent: Mar. 22, 2011

(54) HIGH AVAILABILITY CLUSTER WITH NOTIFICATION OF RESOURCE STATE CHANGES

(75) Inventors: Anantharaman Ganesh, Sunnyvale, CA (US); Kalyani Sundaralingam, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1013 days.

(21) Appl. No.: 11/540,079

(22) Filed: Sep. 29, 2006

(51) Int. Cl.
 *G06F 11/00* (2006.01)
(52) U.S. Cl. .................... 714/4; 714/6; 709/224
(58) Field of Classification Search ............. 714/4, 6
 See application file for complete search history.

(56) References Cited

U.S. PATENT DOCUMENTS

| | | | |
|---|---|---|---|
| 5,946,685 A * | 8/1999 | Cramer et al. ............... 707/10 |
| 6,353,898 B1 | 3/2002 | Wipfel et al. |
| 6,438,705 B1 | 8/2002 | Chao et al. |
| 6,587,959 B1 * | 7/2003 | Sjolander et al. .............. 714/4 |
| 6,624,750 B1 * | 9/2003 | Marman et al. ............. 340/506 |
| 6,738,345 B1 | 5/2004 | Williamson |
| 6,754,664 B1 | 6/2004 | Bush |
| 6,763,479 B1 * | 7/2004 | Hebert ........................ 714/4 |
| 6,943,828 B1 * | 9/2005 | Grimes et al. ............... 348/194 |
| 7,137,040 B2 | 11/2006 | Bae et al. |
| 7,376,722 B1 | 5/2008 | Sim et al. |
| 2003/0041057 A1 * | 2/2003 | Hepner et al. ................. 707/4 |
| 2003/0079154 A1 * | 4/2003 | Park et al. ...................... 714/1 |
| 2003/0163780 A1 * | 8/2003 | Kossa .......................... 715/500 |
| 2004/0083358 A1 * | 4/2004 | Zhou et al. .................. 713/100 |
| 2004/0089482 A1 * | 5/2004 | Ramsden et al. ............... 177/1 |
| 2004/0158777 A1 * | 8/2004 | Bae et al. ...................... 714/47 |
| 2005/0015780 A1 * | 1/2005 | McKeon et al. ............. 719/328 |
| 2005/0055418 A1 * | 3/2005 | Blanc et al. .................. 709/209 |
| 2005/0091375 A1 * | 4/2005 | Straub et al. ................ 709/226 |
| 2005/0172161 A1 * | 8/2005 | Cruz et al. ...................... 714/4 |
| 2005/0188265 A1 * | 8/2005 | Pomaranski et al. .......... 714/26 |
| 2005/0204183 A1 * | 9/2005 | Saika ............................ 714/4 |
| 2005/0223278 A1 * | 10/2005 | Saika .......................... 714/15 |
| 2005/0283636 A1 * | 12/2005 | Vasudevan et al. ............ 714/2 |
| 2005/0289390 A1 * | 12/2005 | Baba .......................... 714/11 |
| 2006/0015773 A1 * | 1/2006 | Singh et al. ................... 714/13 |
| 2006/0085418 A1 * | 4/2006 | Piper et al. ..................... 707/8 |
| 2006/0161637 A1 * | 7/2006 | Friess et al. ................. 709/218 |
| 2006/0168192 A1 * | 7/2006 | Sharma et al. .............. 709/224 |
| 2007/0206611 A1 * | 9/2007 | Shokri et al. ................ 370/400 |
| 2007/0255819 A1 * | 11/2007 | Hua et al. ................... 709/224 |

OTHER PUBLICATIONS

Quéma, et al., "An asynchronous middleware for Grid resource monitoring" (abstract), Sep. 2003, 2 pages, downloaded from http://www3.interscience.wiley.com/journal/107638010/abstract?CRETRY=1&SRETRY=0.

"Using the Event Monitoring Service", Hewlett-Packard Corp., Nov. 1999, 102 pages.

(Continued)

*Primary Examiner* — Scott T Baderman
*Assistant Examiner* — Chae Ko
(74) *Attorney, Agent, or Firm* — Meyertons, Hood, Kivlin, Kowert & Goetzel, P.C.

(57) ABSTRACT

A system and method for detecting a state change of a resource in a high availability (HA) cluster are disclosed. The method comprises registering to receive notification when the resource changes state. The method further comprises receiving a notification of a state change of the resource and automatically performing one or more actions to ensure high availability of the first resource in response to the notification.

17 Claims, 5 Drawing Sheets

OTHER PUBLICATIONS

Baker, et al, "javaGMA: A lightweight implementation of the Grid Monitoring Architecture," UKUUG LISA/Winter Conference, High-Availability and Reliability, Bournemouth, Feb. 25-26, 2004, http://www.ukuug.org/events/winter2004/speakers+abstracts.shtml#id 2717511.

Cottrell, "Network Monitoring Tools," Stanford Linear Accelerator Center, Stanford University, Palo Alto, CA, Nov. 24, 2007, 29 pages. (Printed from http://www.slac.stanford.edu/xorg/nmtf/nmtf-tools.html).

Veritas Cluster Server 4.0 User's Guide, Veritas Corp., Jan. 2004, 715 pages.

* cited by examiner

HIGH AVAILABILITY CLUSTER WITH NOTIFICATION OF RESOURCE STATE CHANGES

BACKGROUND OF THE INVENTION

1. Field of the Invention

This invention relates to high availability (HA) computer clusters. More particularly, the invention relates to a system and method for detecting state changes of resources in an HA cluster.

2. Description of the Related Art

High-availability clusters, also known as HA clusters, are computer clusters that are implemented primarily for the purpose of improving the availability of resources that the cluster provides. They operate by having redundant computers or nodes which are used to provide service when resources fail. For example, normally if a process fails then the process will remain unavailable until an administrator re-starts it. HA clustering remedies this situation by detecting when a process or other resource has failed and automatically re-starting the process or resource, e.g., on another node, without requiring administrative intervention. HA clusters are often used to ensure that resources such as databases, file systems, network addresses, or other resources remain available for applications which require a high degree of dependability, such as electronic commerce websites or other business applications.

In typical HA cluster implementations, the software that ensures high availability of resources periodically polls the state of the resources, e.g., by actively checking to determine whether the resources are functioning properly or not. For example, in some systems the software uses a user-configurable time-period to schedule the periodic polling of all the managed resources. In many implementations, all of the resources are polled at the same time. One disadvantage of this approach is that polling all of the resources at the same time can cause a large spike in the system load, which can lower the responsiveness of the system. This can even lead to spurious failovers when the load created by the monitoring mechanism interferes with the monitoring itself.

Another problem with this method relates to the monitoring of offline resources. In some cases, HA clusters may need to ensure that certain resources are online on only one node. To avoid resources from being online on more than one node, resource states have to be monitored on nodes on which they are expected to be offline. Typically, offline monitoring is more expensive because it involves a complete scan of a system-level data structure in order to ascertain the absence of the resource. For example, for offline process monitoring, the entire process-table may need to be scanned to make sure that the process is not online. Similarly, for a file system mount point, the entire mount tab file may be scanned for the same purpose. This causes increased load on the system.

Also, since this method relies on periodic polling at scheduled time intervals, instantaneous detection of resource state changes is not possible, which may result in failed resources remaining in a failed state until the failure is discovered at the next scheduled polling. The delay in detection of resource state changes is a function of the monitoring interval. Larger monitoring intervals lead to longer failover times, thereby increasing service down-time.

Other HA clusters use a slightly refined version of this method by attempting to stagger the polling of different resources in order to ensure that all of the resources are not polled at the same time. This may help to eliminate large spikes in the system load, but the average system load caused by the resource polling still remains high, and lag time for discovering resource failure is still a problem.

SUMMARY

Various embodiments of a system and method for detecting a state change of a resource in a high availability (HA) cluster are disclosed herein. One embodiment of the method comprises registering to receive notification when the resource changes state. The method further comprises receiving a notification of a state change of the resource and automatically performing one or more actions to ensure high availability of the resource in response to the notification. For example, in one embodiment the notification may indicate that the resource became unavailable, and one or more actions may be performed to make the resource available again.

BRIEF DESCRIPTION OF THE DRAWINGS

A better understanding of the invention can be obtained when the following detailed description is considered in conjunction with the following drawings, in which.

Figure 1:
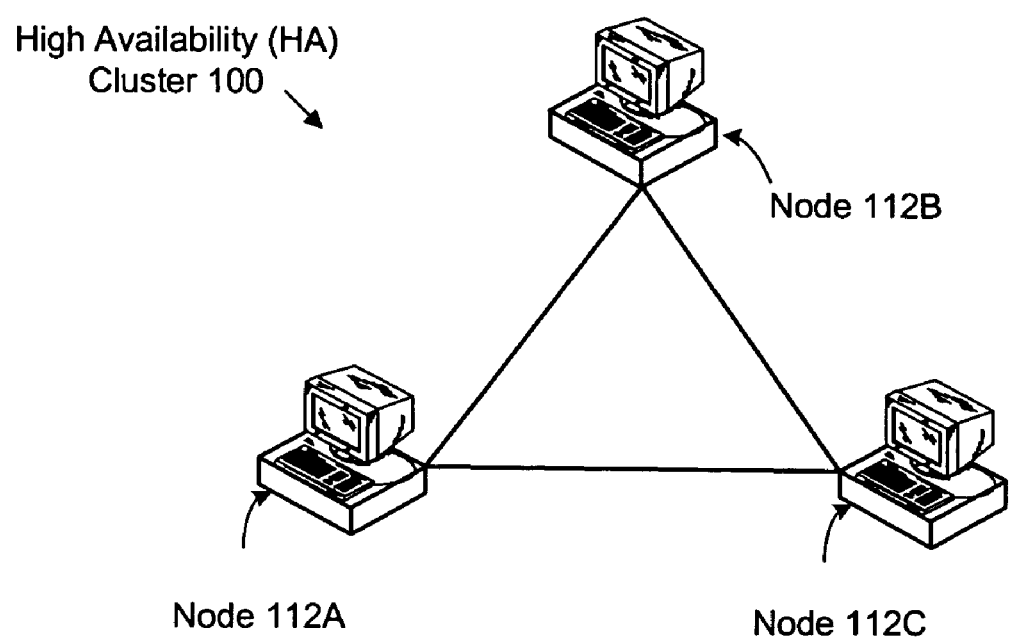
FIG. 1 illustrates an exemplary high availability (HA) cluster that utilizes the method described herein for detecting resource state changes of resources.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for detecting state changes of resources in a high availability (HA) cluster are disclosed herein. The method may be utilized in a HA cluster 100 such as illustrated in FIG. 1. In various embodiments the HA cluster 100 may include any number of two or more nodes 112 (e.g., server computer systems). In the example of FIG. 1, the HA cluster includes three nodes 112A, 112B, and 112C.

The nodes 112 may be coupled to each other through a network. The network may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, the nodes 112 may each be coupled to the network using any type of wired or wireless connection medium. For example, wired mediums may include Ethernet, fiber channel, a modem connected to plain old telephone service (POTS), etc. Wireless connection mediums may include a wireless link such as Wi-Fi™, a wireless connection using a wireless communication protocol such as IEEE 802.11 (wireless Ethernet), a satellite link, a modem link through a cellular service, etc.

The HA cluster 100 may be used to host any of various types of applications, such as an electronic commerce website or other business application. One or more of the nodes 112 may execute software operable to ensure that various resources required by the application remain highly available. In particular, one or more of the nodes 112 may execute resource management software 150 operable to register to receive notifications when resources change state and to automatically perform various actions to ensure high availability of the resources in response to notifications of the state changes.

Figure 2:
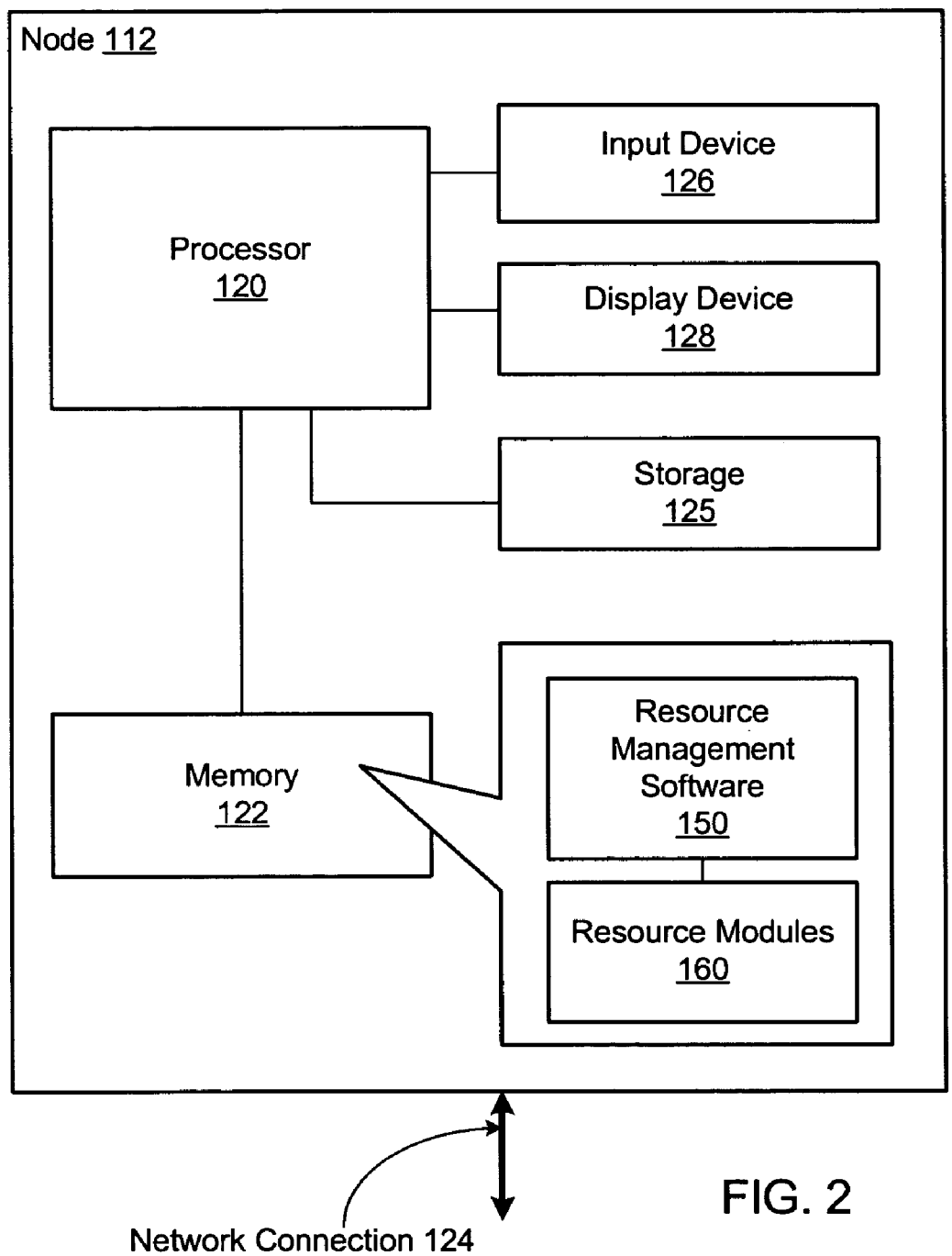
FIG. 2 illustrates an exemplary embodiment of a node that executes resource management software operable to register to receive notifications when resources in the HA cluster change state.

FIG. 2 illustrates an exemplary embodiment of a node 112 that executes the resource management software 150. The node 112 includes a processor 120 coupled to a memory 122. In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the resource management software 150, as well as resource modules 160. As described below, the resource modules 160 may comprise a plurality of software modules, where each module is associated with a particular type of resource and is operable to notify the resource management software 150 when resources of the respective type undergo state changes.

The processor 120 may execute the resource management software 150 and the resource modules 160. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the node 112 may include multiple processors 120.

The node 112 also includes storage 125, e.g., one or more storage devices configured to store instructions and/or data in a stable or non-volatile manner. In various embodiments the storage 125 may include any of various kinds of storage devices, such as optical storage devices or storage devices that utilize magnetic media, e.g., one or more hard drives or tape drives. In one embodiment, the storage 125 may be implemented as one or more hard disks configured independently or as a disk storage system. In one embodiment, the disk storage system may be an example of a redundant array of inexpensive disks (RAID) system. In another embodiment, the disk storage system may be a disk array, or Just a Bunch Of Disks (JBOD), (used to refer to disks that are not configured according to RAID). In yet other embodiments, the storage 125 may include RAM disks, for example.

The node 112 also includes one or more input devices 126 for receiving user input from a user of the node 112. The input device(s) 126 may include any of various types of input devices, such as keyboards, keypads, microphones, or pointing devices (e.g., a mouse or trackball).

The node 112 also includes one or more output devices 128 for displaying output to the user. The output device(s) 128 may include any of various types of output devices, such as LCD screens or monitors, CRT monitors, etc.

The node 112 also includes a network connection 124 through which the node 112 couples to the network. The network connection 124 may include any type of hardware for coupling the node 112 to the network, e.g., to enable communication over the network in a wired or wireless manner.

Figure 3:
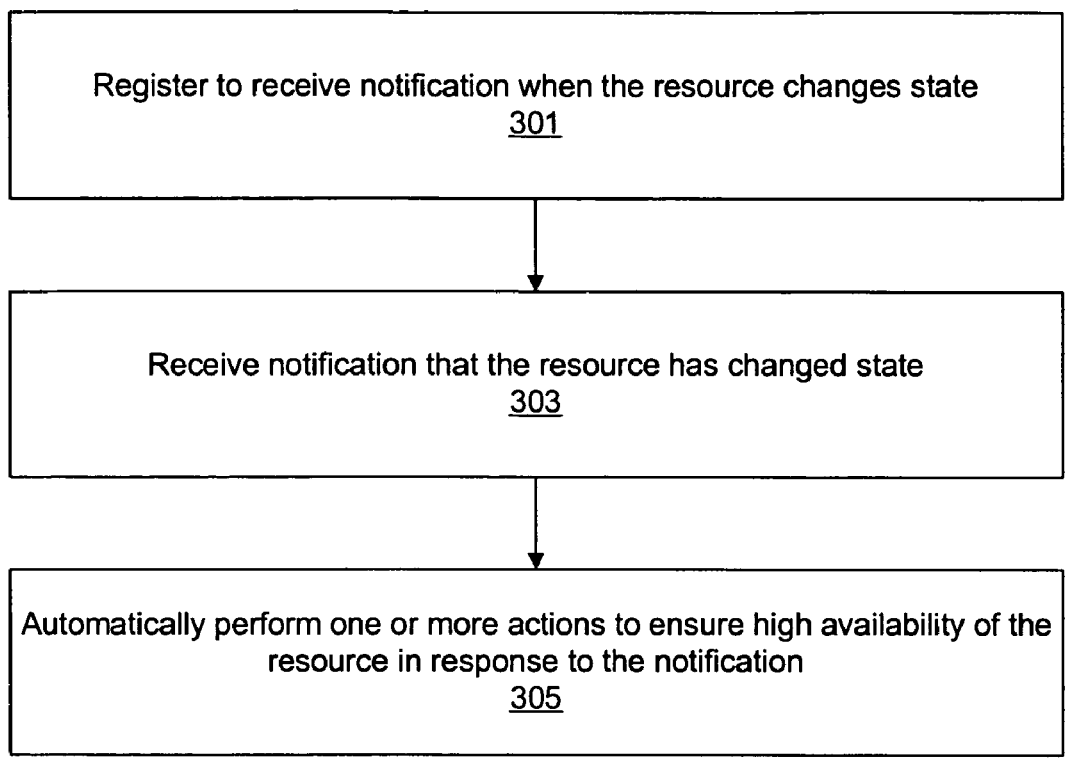
FIG. 3 is a flowchart diagram illustrating one embodiment of a method for ensuring high availability of a given resource in the HA cluster.

FIG. 3 is a flowchart diagram illustrating one embodiment of a method for ensuring high availability of a given resource in the HA cluster 100. The method of FIG. 3 may be implemented by the resource management software 150 executing on a node 112 in the HA cluster 100.

In 301 the resource management software 150 may register to receive notification when the resource changes state. For example, the resource may be a particular type of resource, and the resource management software 150 may communicate with a respective resource module 160 for that type of resource in order to register to receive notification when the resource changes state. For example, the resource module 160 may be operable to detect when the resource changes state and may notify the resource management software 150 of the state change.

In 303, the resource management software 150 may receive notification that the resource has changed state, e.g., may receive the notification from the respective resource module 160 for the resource. In 305, the resource management software 150 may automatically perform one or more actions to ensure high availability of the resource in response to the notification of the state change of the resource. As discussed below, in some embodiments the resource management software 150 may first poll the state of the resource before performing the one or more actions in order to ensure that the state change reported by the resource module 160 is accurate.

In various embodiments the resource management software 150 may perform any of various actions in response to the notification from the resource module 160, e.g., depending on the type of resource and state change. For example, if the resource module 160 notifies the resource management software 150 that the resource went offline or became unavailable then the resource management software 150 may automatically re-start the resource on one or more of the nodes 112 in the HA cluster 100 or may reconfigure one or more of the nodes 112 to make the resource available again.

In various embodiments, the functionality of the resource management software 150 receiving the notification of the resource's state change may be implemented in any of various ways. For example, in some embodiments the resource module 160 may provide an application programming interface that the resource management software 150 calls, which may cause a thread in the resource management software 150 to block or sleep until the resource module 160 detects a state change for the resource. In response to detecting the state change for the resource, the resource module 160 may cause the thread in the resource management software 150 to unblock or awaken and may pass the thread information specifying which resource changed its state.

In various embodiments the method of FIG. 3 may provide certain advantages over methods of monitoring resources in a HA cluster that rely on periodically polling resource states. For example, in some embodiments the respective resource module 160 for a given resource may detect a change in the resource's state virtually instantaneously or with a minimal time delay. Upon detecting the state change, the resource module 160 may immediately notify the resource management software 150 of the state change. Thus, the resource management software 150 may be able to respond to the state change much faster than the traditional method in which the state change is not detected until the scheduled poll of the resource state is performed.

The method of FIG. 3 may also reduce load on the system, e.g., by eliminating or reducing the need to actively poll the states of various resources. This may increase efficiency of the system and allow improved scalability. For example, the method may enable a large number of resources to be monitored without the expense traditionally associated with periodically polling the states of the resources.

Figure 4:
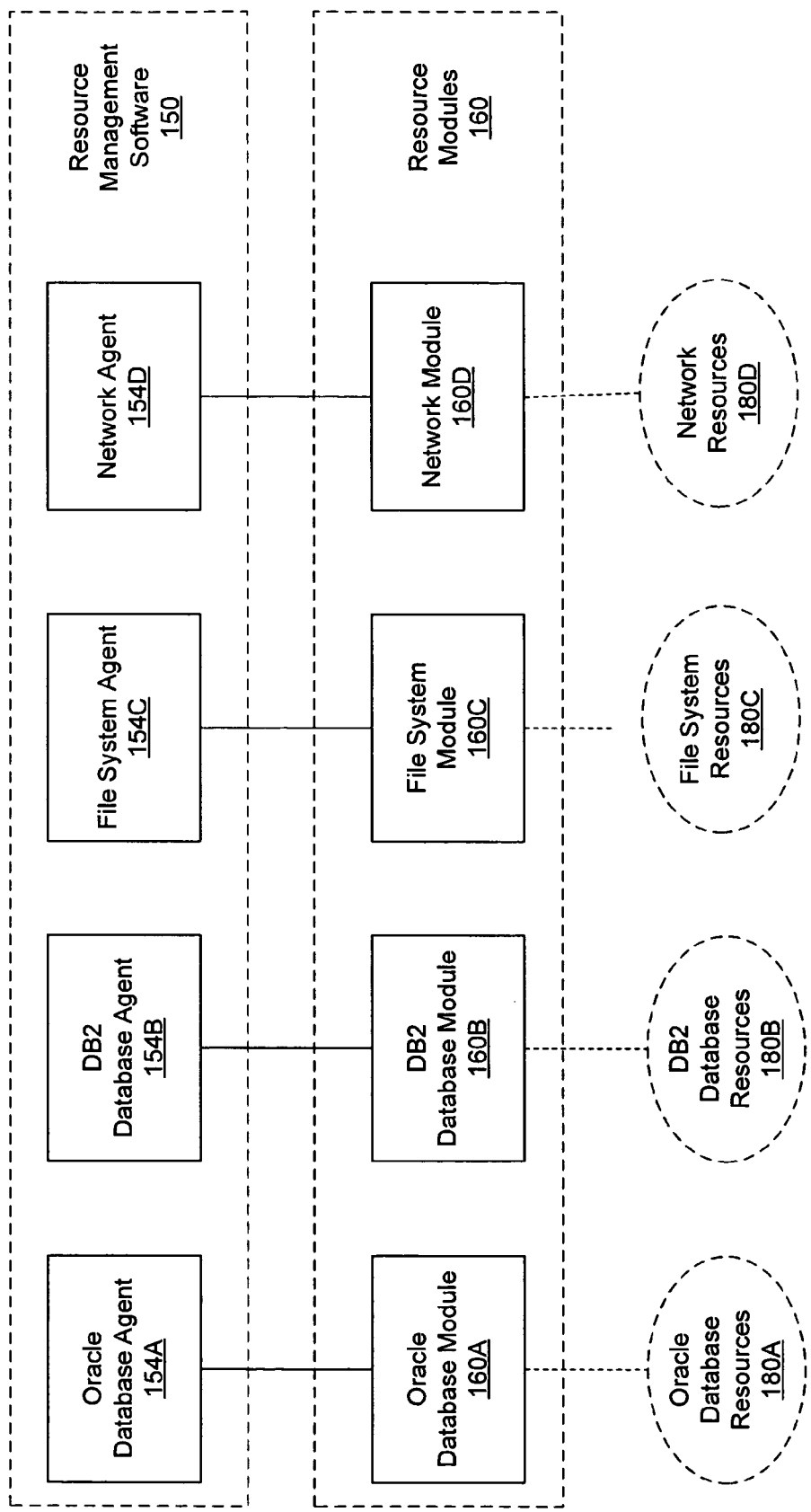
FIG. 4 illustrates an exemplary embodiment of the resource management software and resource modules.

FIG. 4 illustrates an exemplary embodiment of the resource management software 150 and the resource modules 160 in more detail. In various embodiments the resource management software 150 may manage availability for any of various types of resources hosted by the nodes 112 in the HA cluster 100. As one example, the resource management software 150 may manage availability of processes executing on the nodes 112. As another example, the resource management software 150 may manage availability of file system resources, such as file system mount points. As another example, the resource management software 150 may manage availability of network resources, such as IP addresses or network interfaces.

As noted above, each type of resource may have an associated resource module 160 operable to detect when resources of the respective type change state. The resource modules 160 for some types of resources may include software provided by the operating system or software integrated with the operating system, such as device driver software or kernel extensions. For example, a resource module 160 for file system resources may include file system software provided by the operating system. For other types of resources, the resource module 160 may include software provided by a third-party software vendor. For example, for resources associated with a particular type of database, the respective resource module 160 may comprise software provided by the database vendor.

As noted above, a resource module 160 for a given type of resource may notify the resource management software 150 when a resource of that type changes state. In one embodiment the resource management software 150 may include a plurality of agent modules 154, where each respective type of resource has an associated agent that manages availability of resources of that type. The agent 154 for each type of resource may interface with the corresponding resource module 160 in order to receive notifications of state changes for resources of the respective type.

For example, FIG. 4 illustrates an Oracle database agent 154A and an Oracle database module 160A. The Oracle database module 160A may be operable to detect when various resources 180A associated with an Oracle database change state. For example, the Oracle database may have one or more processes operable to serve database requests or operable to manage the Oracle database in various other ways. The Oracle database module 160A may detect when a process changes state, e.g., when a process that was previously executing stops executing (dies) or becomes hung, or when a process that was previously offline begins executing. The Oracle database module 160A may notify the Oracle database agent 154A that the process's state changed. In response to the state change, the Oracle database agent 154A may take various actions, e.g., depending on the type of resource and the type of state change. As one example, if a database process died then the Oracle database agent 154A may re-start the database process on the same node 112. As another example, the Oracle database agent 154A may re-start the database process on another node 112 in the HA cluster 100 or may cause the entire application to fail over to the other node 112.

FIG. 4 also illustrates various other exemplary types of agents 154 and resource modules 160. For example, the DB2 database agent 154B may communicate with the DB2 database module 160B to manage availability of processes or other resources 180B for a DB2 database. The file system agent 154C may communicate with the file system module 160C to manage availability of file system mount points or other file system resources 180C. The network agent 154D may communicate with the network module 160D to manage availability of IP addresses, network interfaces, or other network resources 180D. In other embodiments the resource management software 150 and the resource modules 160 may include agents 154 and corresponding modules 160 for any of various other types of resources.

Thus, resources in the HA cluster 100 may be classified into different types or groups of resources for the purpose of managing their availability in the HA cluster 100, where each type of resource is managed by a corresponding agent 154 and resource module 160. In various embodiments the resources may be classified or grouped in any of various ways, e.g., at varying levels of granularity. For example, in some embodiments a single process agent 154 may manage the availability of any kind of process executing on nodes 112 in the HA cluster 100. In other embodiments, different agents 154 may manage different kinds of processes. For example, as discussed above, in one embodiment an Oracle database agent 154A may manage processes associated with an Oracle database, whereas a DB2 database agent 154B may manage processes associated with a DB2 database. Also, some embodiments may utilize both a generic process agent and specialized process agents. For example, a process associated with an Oracle database may be registered for state change notifications by either a generic process agent or a specialized Oracle database agent, whichever is most appropriate for a particular process.

Also, in some embodiments an agent 154 for a first type of resource may be able to register a resource of the first type with a resource module 160 of a second type, e.g., depending on what kinds of resource modules 160 are available and/or depending on what kind of resource module 160 is most suitable for monitoring the resource. For example, the first type may be a specific subset of the second type. As an example, an Oracle database agent 154A may register a process associated with an Oracle database with either an Oracle-specific resource module 160A or a generic resource module 160B, where the generic resource module 160B can monitor any kind of process. In some embodiments the Oracle database agent 154A may be operable to detect whether an Oracle-specific resource module 160A is present, and if so may register the process with the Oracle-specific resource module 160A, or else may register the process with the generic resource module 160B.

In some embodiments, each agent 154 that executes on a particular node 112 in the HA cluster 100 may only monitor resources hosted on that node 112. For example, the agent 154 may register resources with a resource module 160 that executes on the same node 112, where the resource module 160 is operable to notify the agent 154 when the resources change state. In some embodiments multiple nodes 112 in the HA cluster 100 may each execute one or more agents 154 and corresponding resource modules 160 to monitor resources hosted by the respective nodes.

In another embodiment, an agent 154 that executes on a particular node 112 may monitor resources hosted on the same node 112, as well as possibly monitoring resources hosted on other nodes 112 in the HA cluster 100. For example, the agent 154 may register resources with a resource module 160 that executes on another node 112 in the HA cluster 100, where the resource module 160 on the other node 112 is operable to notify the agent 154 when resources on the other node 112 change state. For example, in one particular embodiment, one of the nodes 112 in the HA cluster 100 may act as a manager node that monitors availability of resources on all the other nodes 112.

Monitoring Framework

Figure 5:
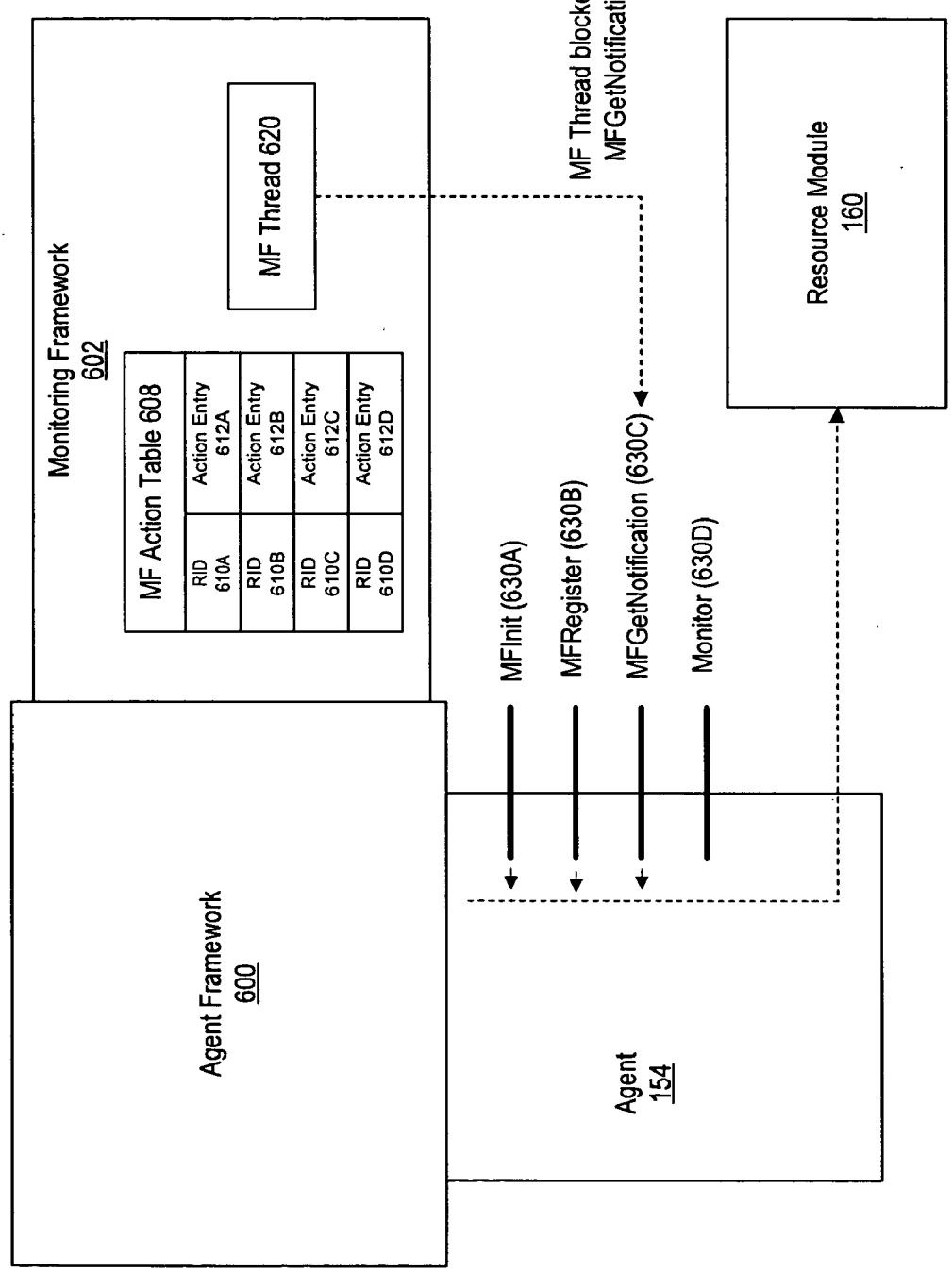
FIG. 5 illustrates an exemplary implementation of the method using a Monitoring Framework.

In one embodiment the method described above may be implemented using a Monitoring Framework (MF) 602, as illustrated in FIG. 5. The Monitoring Framework 602 may provide a type-independent framework which integrates various agents 154 and the corresponding resource modules 160 and enables notification of resource state changes as described above. The Monitoring Framework 602 may be implemented as a part of an agent framework library 600.

Each agent 154 may register, via the Monitoring Framework 602, each resource that it manages with the underlying resource module 160 and may block for notifications of state changes for the registered resources. On receiving a notification, the agent 154 can take the appropriate action.

In one embodiment, each resource module 160 provides three application programming interfaces (APIs), e.g., library calls, as follows: i) to initialize the resource module 160; ii) to register resources with the module; and iii) to block for notifications on state changes to the registered resources. Once the resource module 160 is initialized, the corresponding agent 154 can use the Monitoring Framework 602 to register resources with the resource module 160. The resource module 160 expects parameters defining each resource that the agent 154 registers with it. For example, a resource module 160 designed for monitoring processes may expect as part of registration the process parameters such as the process identifier (pid) for registering online processes, and the pathname and arguments for registering offline processes.

The agent 154 may then block on the blocking call supplied by the resource module 160, via the Monitoring Framework 602, in order to wait for notifications of state changes. When a state change occurs, the resource module 160 unblocks the blocked agent 154 and supplies it with a unique resource identifier (RID) identifying the registered resource that changed its state. For example, when a registered online process dies, the process-monitoring resource module 160 may supply the agent 154 with the process ID of the process that died. Similarly, when a registered offline process comes online, the resource module 160 may supply the agent 154 with a concatenated string of the pathname and arguments that were provided as part of the registration. Based on the unique RID, the Monitoring Framework 602 can determine the resource whose state changed and take the appropriate action.

Each agent 154 may implement the following entry points (EPs) 630:

1) Monitor: This entry point polls the state of a particular resource. The Monitor entry point reports the state of the resource to the caller. For example, in an agent 154 for managing processes, the Monitor entry point may poll the state of a particular process on a node 112 by scanning the process table on the node 112, e.g., to determine whether the process is online (currently executing) or offline (not currently executing), and may report the online/offline state to the caller. In agents that manage other types of resources, the Monitor entry point may determine the state of the resource in any of various other ways, as appropriate. For example, for an agent that manages file system mount points, the Monitor entry point may scan a mount tab file or other information maintained by the file system to determine whether a particular file system mount point is currently mounted or not.

As described below, it may be useful to actively poll the state of a resource by calling the Monitor entry point, for example, in order to ascertain whether the resource is in steady state before registering for state change notifications and/or to periodically poll the resource (at a reduced frequency) as a safeguard.

2) MFInit: This entry point allows the underlying resource module 160 for the respective resource type to be initialized. This entry point may be called once by the agent framework during startup of the agent.

3) MFRegister: This entry point allows a resource to be registered with the underlying resource module 160. It is called once for each resource for which state change notifications are desired. If this entry point returns successfully then subsequent periodic invocations of the Monitor entry point will be performed less frequently, as described in detail below.

4) MFGetNotification: This entry point is expected to block for notifications from the underlying resource module 160. It is called by a separate thread, called the MF thread 620, in the agent 154 when the agent 154 starts up. When a resource state change occurs, the MF thread is awakened (un-blocked) and provided with the resource ID of the respective resource.

When an agent 154 starts up, the agent framework initializes the monitoring framework (MF) for the agent. As part of this initialization, the agent framework calls the agent's MFInit entry point. The MFInit entry point returns a value indicating whether the initialization was successful or not. If successful, the Monitoring Framework 602 makes sure that the MFRegister and MFGetNotification entry points are also implemented by the agent. If they are not implemented, the Monitoring Framework 602 sets an mf_available flag to FALSE to indicate that Monitoring Framework 602 functionality is unavailable for that type of resource.

If the MFRegister and MFGetNotification entry points are implemented then the MF thread 620 is created. The MF thread 620 immediately calls the MFGetNotification entry point and blocks for notification events. At this point, the MF thread 620 is not yet expected to be awakened by any notifications because no resources have yet been registered with the Monitoring Framework 602. A data structure called the MF action table 608 is also initialized, as described in more detail below. The Monitoring Framework 602 also sets the mf_available flag to TRUE to indicate that Monitoring Framework 602 functionality is available for the resource type.

After initialization, the state of each resource may be probed one or more times to ascertain its state. For each resource, once the resource has been determined to be in a steady state, the Monitoring Framework 602 may then invoke the MFRegister entry point the appropriate arguments specifying the resource. If the MFRegister entry point is successful, it returns to the Monitoring Framework 602 a unique resource identifier (RID) 610 corresponding to the resource that was registered. The Monitoring Framework 602 adds the RID 610 to the MF action table 608 along with an action entry 612 for the resource. Thus, each entry in the MF action table 608 maps a RID 610 for a given resource to an action entry 612 for the resource. The action entry 612 specifies the resource's name and the type of action that needs to be taken when the resource's state changes. In one embodiment, the default action is to invoke the traditional Monitor entry point for the resource.

After the registration is successful, a mf_on flag may be set to TRUE to indicate that the resource is being monitored by the Monitoring Framework 602. In some embodiments the state of the resource may no longer be actively polled at this point, since the underlying module is expected to notify the Monitoring Framework 602 of state changes for the resource after the resource has been registered. In other embodiments, the state of the resource may still be actively polled periodically by invoking the Monitor entry point, but at a reduced frequency. Polling the resource's state at a reduced frequency may provide a safeguard to ensure that the resource has not changed state without notification of the state change being received, while still reducing load on the system as compared to the traditional method of frequent time-based polling.

If the registration for the resource was not successful then the Monitor entry point may continue to be invoked periodically at a relatively high frequency, e.g., as in the traditional time-based polling methods performed in prior art HA clusters. The Monitoring Framework 602 may continue to try to register the resource either until the registration is successful or a threshold number of registration attempts have been performed.

While the various resources are being registered, the MF thread 620 created during the call to the MFInit entry point is blocked on the call to the MFGetNotification entry point, waiting on events from the underlying resource module 160. The MF thread 620 blocks until a registered resource experiences a state change. When one of the registered resources changes its state, the MFGetNotification returns along with the unique RID for that resource, i.e., the RID that was returned when the call to the MFRegister entry point for the resource succeeded earlier.

The Monitoring Framework 602 uses the RID returned by the MFGetNotification entry point as a key into the MF action table 608 to find the action entry for the resource. If the action to be taken is the default action of invoking the Monitor entry point then the MF thread 620 inserts a monitor command for the resource and blocks again on a call to the MFGetNotification entry point.

The MF thread 620 also sets the mf_on flag to FALSE to indicate that the resource is not being monitored by the Monitoring Framework 602 anymore. This is because the entry for the resource in the MF action table 608 is removed. The underlying resource module 160 is not expected to retain any information about the resource, and the information about the resource is now stale since the resource has changed state.

The Monitor entry point may be invoked to poll the state of the resource, e.g., in order to validate that the state of the resource changed as indicated by the MFGetNotification entry point. In some cases the MFGetNotification entry point may have returned an indication that a previously online resource went offline, but the Monitor entry point may find that the resource is still online. This may occur, for example, if the underlying resource module 160 gave a spurious notification of a state change or if the resource was re-started by an external entity. In this case, the resource will be re-registered with the Monitoring Framework 602.

If the Monitor entry point finds that the resource did in fact go offline then this indicates a failure of the resource. In this case the agent framework takes the normal course of actions for the resource fault, e.g., by restarting the resource on a different node 112 in the HA cluster 100, or taking any of various other actions appropriate for a given application and resource.

To illustrate an exemplary use of the techniques described above, consider a case where it is necessary to maintain high availability of a process p1, where the process p1 has a pathname of "/bin/mybinary", takes arguments "-arg1-arg2" and has an owner of "User1". As discussed above, an agent 154 for managing processes, also referred to as a process agent, may manage the availability of the process p1.

The process agent 154 may first call its Monitor entry point to determine the state of the process p1, e.g., to determine whether the process is online (currently executing) or offline (not executing). The process agent passes the Monitor entry point information regarding the process p1, e.g., specifying its pathname, arguments, and owner. The Monitor entry point scans the node's process table to determine whether the process p1 is online, e.g., by determining whether there is a process with a pathname of "/bin/mybinary", arguments of "-arg1-arg2, and an owner of "User1". The Monitor entry point returns a value indicating whether or not the process p1 is online.

The Monitoring Framework 602 waits for another monitoring interval, e.g., a user-configurable time period for periodic monitoring, and then invokes the Monitor entry point again. If the Monitor entry point returns the same online or offline value as before then the Monitoring Framework 602 considers the process p1 to be in a steady state.

Suppose that the Montor entry point indicated for both invocations that the process p1 is online. The Monitoring Framework 602 then calls the MFRegister entry point, passing information describing the attributes of the process p1 and requesting to register the process p1 as being in an online state. The MFRegister entry point scans the process table for a process that matches the received attributes. It is expected to find one since the Monitoring Framework 602 indicated that the process is currently online. If the MFRegister entry point finds a matching process then it obtains the process identifier (pid) for the process and uses the pid to register the process with the resource module 160. The MFRegister entry point then returns a value indicating a successful registration.

The MFRegister entry point also returns a unique string resource identifier (RID) as an output parameter, where the RID is received from the underlying resource module during the registration. For example, suppose that the RID is the string "12345". The Monitoring Framework 602 stores a mapping between "12345" and "p1" in the MF action table 608 and stops the periodic invocation of the Monitor entry point for the process p1.

As described above, the MF thread 620 is blocking or sleeping on a call to the process agent's MFGetNotification entry point all this while. If the process p1 dies then the underlying resource module detects that the process p1 has died and wakes up the MF thread 620, passing it the RID "12345". The MF thread 620 checks the MF action table 608 to find that the RID "12345" maps to "p1" and issues a request to probe the state of the process p1. The process agent invokes the Monitor entry point again for the process p1.

The Monitor entry point is expected to find the process p1 to be offline. From this point, the set of actions taken is the same as in prior art HA cluster environments when a process is determined to have gone offline. For example, the process p1 may be re-started on another node in the HA cluster.

It is noted that if the registration of the process p1 had not been successful then the periodic invocation of the Monitor entry point to actively poll the state of the process p1 would have continued. In some embodiments the Monitor entry point may still be periodically invoked as a safeguard even if the registration of the process p1 is successful, but it may be invoked at a reduced rate (e.g., with longer delays between each invocation).

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for monitoring resources in a high availability (HA) cluster, wherein the HA cluster comprises a plurality of nodes, the method comprising:
    registering with a resource module to receive a notification of a change of an availability state of a first resource on a first node in the HA cluster, wherein the first resource is of a first resource type, wherein the resource module is configured to monitor a plurality of resources of the first resource type including the first resource, and wherein the registering comprises sending a unique identifier of the first resource to the resource module;
    blocking for receipt of the notification in response to the registering with the resource module;
    unblocking in response to the resource module detecting the change in the availability state of the first resource of the first node in the HA cluster;
    receiving the notification of the change of the availability state of the first resource on the first node in the HA cluster, wherein the notification is received from the resource module after the change in the availability state of the first resource is detected by the resource module, wherein the notification comprises the unique identifier of the first resource; and
    automatically performing one or more actions to ensure high availability of the first resource in response to the notification.

2. The method of claim 1,
    wherein the notification indicates that the first resource became unavailable;
    wherein said automatically performing the one or more actions to ensure high availability of the first resource comprises automatically re-configuring one or more of the nodes in the HA cluster to make the first resource available again.

3. The method of claim 1, further comprising:
    polling the first node one or more times to determine a state of the first resource before said registering, wherein said polling determines that the first resource is in a first availability state;
    wherein said registering with the resource module to receive the notification of the change of the availability state of the first resource comprises registering with the resource module to receive the notification when the first resource changes to an availability state other than the first availability state.

4. The method of claim 1, further comprising:
    polling the first node one or more times to determine an availability state of the first resource after said registering, wherein said polling provides a safeguard to ensure that the first resource has not changed the availability state without the notification of the change of the availability state being received.

5. The method of claim 1, further comprising:
    polling the first resource in order to validate the change of the availability state of the first resource received in the notification;
    wherein the one or more actions are performed in response to validating that the change of the availability state of the first resource is accurate.

6. The method of claim 1,
    wherein the first resource comprises a process;
    wherein the notification indicates that the process stopped executing;
    wherein said automatically performing the one or more actions to ensure high availability of the first resource comprises automatically re-starting the process.

7. The method of claim 6,
    wherein said automatically re-starting the process comprises automatically re-starting the process on the first node.

8. The method of claim 6,
    wherein said automatically re-starting the process comprises automatically re-starting the process on a second node in the HA cluster.

9. The method of claim 1,
    wherein the first resource comprises a file system mount point;
    wherein the notification indicates that the file system mount point became unmounted;
    wherein said automatically performing the one or more actions to ensure high availability of the first resource comprises automatically re-mounting the file system mount point.

10. The method of claim 1,
    wherein the first resource comprises an IP address;
    wherein the notification indicates that the IP address became unavailable;
    wherein said automatically performing the one or more actions to ensure high availability of the first resource comprises automatically modifying a network configuration to make the IP address available again.

11. The method of claim 1,
    wherein the registering with the resource module to receive the notification of the change of the availability state comprises a first agent registering with the resource module to receive the notification when the first resource changes the availability state, wherein the first agent executes to ensure high availability of resources of the first resource type;
    wherein said receiving the notification of the change of the availability state of the first resource comprises the first agent receiving the notification of the change of the availability state of the first resource;
    wherein the method further comprises a second agent registering with a second resource module to receive a notification of a change in an availability state of a second resource of a second resource type, wherein the second agent executes to ensure high availability of resources of the second resource type.

12. A computer-readable memory medium for monitoring resources in a high availability (HA) cluster, wherein the HA cluster comprises a plurality of nodes, the computer-readable memory medium comprising program instructions executable to:
    register with a resource module to receive a notification of a change of an availability state of a first resource on a first node in the HA cluster, wherein the first resource is of a first resource type, wherein the resource module is configured to monitor a plurality of resources of the first resource type including the first resource, and wherein the registering comprises sending a unique identifier of the first resource to the resource module;

block for receipt of the notification in response to the registering with the resource module;

unblock in response to the resource module detecting the change in the availability state of the first resource of the first node in the HA cluster;

receive the notification of the change of the availability state of the first resource on the first node in the HA cluster, wherein the notification is received from the resource module after the change in the availability state of the first resource is detected by the resource module, wherein the notification comprises the unique identifier of the first resource; and automatically perform one or more actions to ensure high availability of the first resource in response to the notification.

13. The computer-readable memory medium of claim 12, wherein the notification indicates that the first resource became unavailable;

wherein said automatically performing the one or more actions to ensure high availability of the first resource comprises automatically re-configuring one or more of the nodes in the HA cluster to make the first resource available again.

14. The computer-readable memory medium of claim 12, wherein the program instructions are further executable to:

poll the first node one or more times to determine a state of the first resource before said registering, wherein said polling determines that the first resource is in a first availability state;

wherein said registering to receive the notification of the change of the availability state of the first resource comprises registering to receive the notification when the first resource changes to an availability state other than the first availability state.

15. The computer-readable memory medium of claim 12, wherein the program instructions are further executable to:

poll the first resource in order to validate the change of the availability state of the first resource received in the notification;

wherein the one or more actions are performed in response to validating that the change of the availability state of the first resource is accurate.

16. A node comprising:

a processor; and a memory storing program instructions;

wherein the processor is operable to execute the program instructions to:

register with a resource module to receive a notification of a change of an availability state of a first resource on a first node in the HA cluster, wherein the first resource is of a first resource type, wherein the resource module is configured to monitor a plurality of resources of the first resource type including the first resource, and wherein the registering comprises sending a unique identifier of the first resource to the resource module;

block for receipt of the notification in response to the registering with the resource module;

unblocking in response to the resource module detecting the change in the availability state of the first resource of the first node in the HA cluster;

receive the notification of the change of the availability state of the first resource on the first node in the HA cluster, wherein the notification is received from the resource module after the change in the availability state of the first resource is detected by the resource module, wherein the notification comprises the unique identifier of the first resource; and automatically perform one or more actions to ensure high availability of the first resource in response to the notification.

17. The node of claim 16, wherein the processor is further operable to execute the program instructions to:

poll the first resource in order to validate the change of the availability state of the first resource received in the notification;

wherein the one or more actions are performed in response to validating that the change of the availability state of the first resource is accurate.

\* \* \* \* \*